US012275511B2

(12) United States Patent
Waldvogel et al.

(10) Patent No.: US 12,275,511 B2
(45) Date of Patent: Apr. 15, 2025

(54) MARINE DRIVE HAVING VENTED LOWER UNIT

(71) Applicant: Brunswick Corporation, Mettawa, IL (US)

(72) Inventors: David J. Waldvogel, Fond du Lac, WI (US); Kass W. Sawyer, Neenah, WI (US); Laura K. Mueller, Fond du Lac, WI (US); Douglas A. Hull, Campbellsport, WI (US); Aaron J. Novak, North Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 576 days.

(21) Appl. No.: 17/671,041

(22) Filed: Feb. 14, 2022

(65) Prior Publication Data
US 2023/0257095 A1 Aug. 17, 2023

(51) Int. Cl.
B63H 20/32 (2006.01)
B63H 20/06 (2006.01)
B63H 21/17 (2006.01)
H02K 5/10 (2006.01)
H02K 5/20 (2006.01)
B63H 20/02 (2006.01)

(52) U.S. Cl.
CPC ............ B63H 20/32 (2013.01); B63H 20/06 (2013.01); B63H 21/17 (2013.01); H02K 5/10 (2013.01); H02K 5/207 (2021.01); B63H 2020/025 (2013.01); H02K 2209/00 (2013.01)

(58) Field of Classification Search
None
See application file for complete search history.

(56) References Cited

U.S. PATENT DOCUMENTS 1,764,388 A * 6/1930 Buchet .................. B63H 23/24
310/87
2,247,671 A * 7/1941 Tepel .................. H02G 15/013
174/76

(Continued)

FOREIGN PATENT DOCUMENTS

DE 102019213702 A1 3/2021
EP 775630 5/1997

(Continued)

OTHER PUBLICATIONS

Extended European Search Report for EP Application No. 23154210.1, dated Jul. 19, 2023.

(Continued)

Primary Examiner — S. Joseph Morano
Assistant Examiner — Jovon E Hayes
(74) Attorney, Agent, or Firm — Andrus Intellectual Property Law, LLP

(57) ABSTRACT

A marine drive is for propelling a marine vessel in a body of water. The marine drive comprises a motor housing defining a motor cavity; a motor disposed in the motor cavity; a propulsor shaft extending from the motor housing, wherein the motor is configured to cause rotation of the propulsor shaft; a propulsor which is rotated by the propulsor shaft to create a thrust force in the body of water; and a vent conduit having a first end connected to the motor cavity and a second end which vents the motor cavity to atmosphere.

20 Claims, 6 Drawing Sheets

(56) References Cited

U.S. PATENT DOCUMENTS

| | | | |
|---|---|---|---|
| 2,545,086 A * | 3/1951 | Harris | B63H 25/02 |
| | | | 74/494 |
| 2,877,733 A * | 3/1959 | Harris | B63H 20/007 |
| | | | 440/58 |
| 3,052,204 A * | 9/1962 | Scivally | B63H 23/24 |
| | | | 440/62 |
| 4,066,032 A | 1/1978 | Calvin | |
| 4,226,432 A | 10/1980 | Nakamizo | |
| 4,267,401 A | 5/1981 | Wilkinson | |
| 4,632,487 A | 12/1986 | Wargula | |
| 4,744,777 A * | 5/1988 | Ferguson | B63H 25/20 |
| | | | 180/440 |
| 5,114,352 A | 5/1992 | Gahagen et al. | |
| 5,197,910 A * | 3/1993 | Kanno | F02B 61/045 |
| | | | 440/89 R |
| 5,235,138 A | 8/1993 | Shah et al. | |
| 5,445,545 A | 8/1995 | Draper | |
| 5,510,577 A | 4/1996 | Corrigan | |
| 5,831,217 A | 11/1998 | Jarvis et al. | |
| 6,521,840 B1 | 2/2003 | Kreutz | |
| 6,923,134 B1 | 8/2005 | Vrudny et al. | |
| 6,966,806 B1 | 11/2005 | Bruestle et al. | |
| 7,435,147 B1 | 10/2008 | Eichinger | |
| 7,452,251 B2 | 11/2008 | Boebel | |
| 7,659,699 B2 | 2/2010 | Boebel | |
| 8,043,135 B1 | 10/2011 | Corn | |
| 8,337,264 B2 | 12/2012 | Boebel | |
| 8,529,305 B2 | 9/2013 | Lin | |
| 8,628,091 B2 | 1/2014 | Davidson | |
| 9,446,830 B2 | 9/2016 | Hartmeyer et al. | |
| 9,481,435 B1 | 11/2016 | Jaszewski et al. | |
| 9,490,619 B2 | 11/2016 | Smith | |
| 9,630,694 B1 * | 4/2017 | Jaszewski | F01M 11/12 |
| 9,701,383 B1 | 7/2017 | Stuber et al. | |
| 9,718,526 B2 | 8/2017 | Biebach et al. | |
| 9,789,946 B2 | 10/2017 | Biebach et al. | |
| 9,815,541 B2 | 11/2017 | Biebach et al. | |
| 9,853,465 B2 | 12/2017 | Biebach et al. | |
| 9,896,172 B1 * | 2/2018 | Pugh | F16H 57/0435 |
| 9,963,213 B1 | 5/2018 | Jaszewski et al. | |
| 10,096,863 B2 | 10/2018 | Hartmeyer et al. | |
| 10,124,870 B2 | 11/2018 | Bergmann et al. | |
| 10,263,361 B1 | 4/2019 | Gretz | |
| 10,266,244 B2 | 4/2019 | Bergmann et al. | |
| 10,343,759 B2 | 7/2019 | Despineux | |
| 10,351,220 B1 | 7/2019 | Witte | |
| 10,384,757 B2 | 8/2019 | Mueller et al. | |
| 10,421,363 B2 | 9/2019 | Biebach | |
| 10,472,036 B2 | 11/2019 | Spengler et al. | |
| 10,556,659 B2 | 2/2020 | Biebach et al. | |
| 10,647,398 B2 | 5/2020 | Biebach | |
| 10,862,087 B2 | 12/2020 | Hartmeyer | |
| 10,926,853 B2 | 2/2021 | Despineux et al. | |
| 10,981,637 B1 | 4/2021 | Alby et al. | |
| 11,001,360 B2 | 5/2021 | Basler | |
| 11,021,224 B2 | 6/2021 | Biebach | |
| 11,040,761 B2 | 6/2021 | Biebach et al. | |
| 11,066,141 B2 | 7/2021 | Despineux et al. | |
| 11,091,241 B2 | 8/2021 | Despineux et al. | |
| 11,155,322 B2 | 10/2021 | Baros | |
| 11,572,145 B1 * | 2/2023 | Andrasko | B63H 20/28 |
| 11,866,137 B1 * | 1/2024 | Jaszewski | B63H 20/06 |
| 2009/0269994 A1 | 10/2009 | Alston | |
| 2020/0017183 A1 | 1/2020 | He et al. | |
| 2023/0182880 A1 | 6/2023 | Jaszewski | |
| 2023/0257095 A1 * | 8/2023 | Waldvogel | H02K 5/207 |
| | | | 440/76 |

FOREIGN PATENT DOCUMENTS

| | | | |
|---|---|---|---|
| EP | 775630 A1 * | 5/1997 | B63H 20/007 |
| FR | 2542518 | 3/1938 | |

OTHER PUBLICATIONS

Extended European Search Report issued in EP Application No. 2220682938, dated May 15, 2023.
Amphenol. Sell sheet for RADLOK product line. Document created Oct. 23, 2014.
Amphenol. Sell sheet for SurLok product line. Document created Oct. 23, 2014.
Declaration of Prior Art.
EPropulsion Brand Products found online at https://www.epropulsion.com/who-we-are/, accessed Feb. 9, 2022.
Fergus, et al. Unpublished U.S. Appl. No. 17/487,116, filed Sep. 28, 2021.
Jaszewski, et al. Unpublished U.S. Appl. No. 17/550,463, filed Dec. 14, 2021.
Sawyer, et al. Unpublished U.S. Appl. No. 17/469,479, filed Sep. 8, 2021.
Schmidt, et al. Unpublished U.S. Appl. No. 17/585,214, filed Jan. 26, 2022.
Schrank, et al. Unpublished U.S. Appl. No. 17/509,739, filed Oct. 25, 2021.
Seta, et al. Unpublished U.S. Appl. No. 17/554,540, filed Dec. 17, 2021.

* cited by examiner

MARINE DRIVE HAVING VENTED LOWER UNIT

FIELD

The present disclosure relates to marine drives for propelling a marine vessel in water.

BACKGROUND

The following U.S. Patents and Applications are incorporated by reference in entirety.

U.S. Pat. No. 9,701,383 discloses a marine propulsion support system having a transom bracket, a swivel bracket, and a mounting bracket. A drive unit is connected to the mounting bracket by a plurality of vibration isolation mounts, which are configured to absorb loads on the drive unit that do not exceed a mount design threshold. A bump stop located between the swivel bracket and the drive unit limits deflection of the drive unit caused by loads that exceed the threshold. An outboard motor includes a transom bracket, a swivel bracket, a cradle, and a drive unit supported between first and second opposite arms of the cradle. First and second vibration isolation mounts connect the first and second cradle arms to the drive unit, respectively. An upper motion-limiting bump stop is located remotely from the vibration isolation mounts and between the swivel bracket and the drive unit.

U.S. Pat. No. 9,963,213 discloses a system for mounting an outboard motor propulsion unit to a marine vessel transom. The propulsion unit's midsection has an upper end supporting an engine system and a lower end carrying a gear housing. The mounting system includes a support cradle having a head section coupled to a transom bracket, an upper structural support section extending aftward from the head section and along opposite port and starboard sides of the midsection, and a lower structural support section suspended from the upper structural support section and situated on the port and starboard sides of the midsection. A pair of upper mounts couples the upper structural support section to the midsection proximate the engine system. A pair of lower mounts couples the lower structural support section to the midsection proximate the gear housing. At least one of the upper and lower structural support sections comprises an extrusion or a casting.

U.S. patent application Ser. No. 17/469,479 discloses a propulsion device for rotating a propulsor to propel a marine vessel. The propulsion device includes a drive housing having a cavity that extends along a first central axis. A motor is positioned within the cavity. The motor rotates a shaft extending along a second central axis that is non-coaxial with the first central axis. The shaft is configured to rotate the propulsor to propel the marine vessel.

U.S. patent application Ser. No. 17/487,116 discloses an outboard motor having a transom clamp bracket configured to be supported on a transom of a marine vessel and a swivel bracket configured to be supported by the transom clamp bracket. A propulsion unit is supported by the swivel bracket, the propulsion unit comprising a head unit, a midsection below the head unit, and a lower unit below the midsection. The head unit, midsection, and lower unit are generally vertically aligned with one another when the outboard motor is in a neutral tilt/trim position. The propulsion unit is detachable from the transom clamp bracket.

U.S. patent application Ser. No. 17/509,739 discloses an apparatus for removably supporting a marine drive on a marine vessel. The apparatus has a transom bracket assembly for mounting to the marine vessel, a steering bracket for coupling the marine drive to the transom bracket assembly so the marine drive is steerable relative to the transom bracket assembly and the marine vessel, and an integrated copilot and locking mechanism configured to retain the steering bracket in a plurality of steering orientations. The mechanism is further configured to lock and alternately unlock the steering bracket relative to the transom bracket assembly such that in a locked position the marine drive is retained on the transom bracket assembly and such that in an unlocked position the marine drive is removable from the transom bracket assembly.

U.S. patent application Ser. No. 17/550,463 discloses a marine drive having a supporting frame for coupling the marine drive to a marine vessel, a gearcase supporting a propulsor for propelling the marine vessel in water, an extension leg disposed between the supporting frame and the gearcase, and an adapter plate between the supporting frame and the extension leg. A tube is in the extension leg. The tube has a lower end which is coupled to the gearcase and upper end which is coupled to the adapter plate by a compression nut threaded onto the tube, wherein threading the compression nut down on the tube compressively engages the compression nut with the adapter plate, which in turn clamps the extension leg between the supporting frame and the gearcase.

U.S. patent application Ser. No. 17/554,540 discloses an outboard motor having a cowling, a gearcase, a midsection located axially between the cowling and the gearcase, a steering arm extending forwardly from the midsection, and an anti-ventilation plate between the midsection and the gearcase. A wing extends laterally from the steering arm. The wing, a lateral side of the cowling, and a lateral side of the gearcase together define a side tripod which supports the outboard motor in a side laydown position. The anti-ventilation plate has a rear edge with laterally outer rear support members, which together with the rear of the cowling form a rear tripod which supports the outboard motor in a rear laydown position.

U.S. patent application Ser. No. 17/585,214 discloses a marine drive for propelling a marine vessel. The marine drive has a propulsor configured to generate a thrust force in a body of water; a battery that powers the propulsor; and a supporting frame which supports the marine drive relative to marine vessel. The supporting frame has a monolithic body defining a frame interior, and further has a support leg extending downwardly from the monolithic body and a steering arm extending forwardly from monolithic body. A cowling is fixed to the supporting frame via at least one hidden fastener that extends from the frame interior, through the supporting frame, and into engagement with the cowl body, wherein hidden fastener being accessible during installation.

SUMMARY

This Summary is provided to introduce a selection of concepts which are further described herein below in the Detailed Description. This Summary is not intended to identify key or essential features of the claimed subject matter, nor is it intended to be used as an aid in limiting scope of the claimed subject matter.

In non-limiting embodiments disclosed herein, a marine drive is for propelling a marine vessel in a body of water. The marine drive comprises a motor housing defining a motor cavity; a motor disposed in the motor cavity; a propulsor shaft extending from the motor housing, wherein the motor is configured to cause rotation of the propulsor shaft; a propulsor which is rotated by the propulsor shaft to create a thrust force in the body of water; and a vent conduit having a first end connected to the motor cavity and a second end which vents the motor cavity to atmosphere.

In non-limiting embodiments disclosed herein, a marine drive for propelling a marine vessel in a body of water. The marine drive comprises a supporting frame for supporting the marine drive relative to the marine vessel; a motor housing defining a motor cavity; a supporting leg which couples the motor housing to the supporting frame; a motor disposed in the motor cavity; a propulsor shaft extending from the motor housing, wherein the motor is configured to cause rotation of the propulsor shaft; a propulsor which is rotated by the propulsor shaft to create a thrust force in the body of water; a vent conduit having a first end connected to the motor cavity and a second end which vents the motor cavity to atmosphere, wherein the vent conduit extends from the motor housing into the extension leg; and a hydrophobic plug on the second end of the vent conduit, the hydrophobic plug permitting venting of air and moisture from the motor cavity and preventing ingress of moisture to the motor cavity.

BRIEF DESCRIPTION OF THE DRAWINGS

Embodiments are described with reference to the following drawing figures. The same numbers are used throughout to reference like features and components.

DETAILED DISCLOSURE

The invention described herein has been found to be particularly useful in configurations of marine drives having a battery-powered electric motor located in a lower gearcase and being configured to power a propulsor, such as one or more propeller(s), impeller(s), and/or the like. The illustrated embodiment is an outboard motor and is one example of such a marine drive; however the present invention is not limited for use with the illustrated configuration, and in other examples the present invention can be implemented in differently configured marine drives having for example, a hybrid-electric powerhead, and/or the like. The particular configurations of the marine drive shown and described herein below, including the supporting frame, electric motor, and gearcase, are merely exemplary. The present invention is also useful in conjunction with many other marine drive configurations.

During research and experimentation with prior art marine drives, the present inventors determined that thermal expansion of the air trapped within a sealed submerged system can result in leakage of air out, which upon cooling will create a vacuum, and potentially an unwanted intrusion of water. In the presently described embodiment, an electric motor located in the lower unit of the marine drive generates heat, which results in excess pressure buildup in the sealed lower unit. Providing a dedicated path to atmosphere was identified as a benefit for the sealing system of such a marine drive. The present inventors further realized that it would be advantageous to provide the path to atmosphere with protection from humidity and other moisture sources found above the submerged item.

Figure 1:
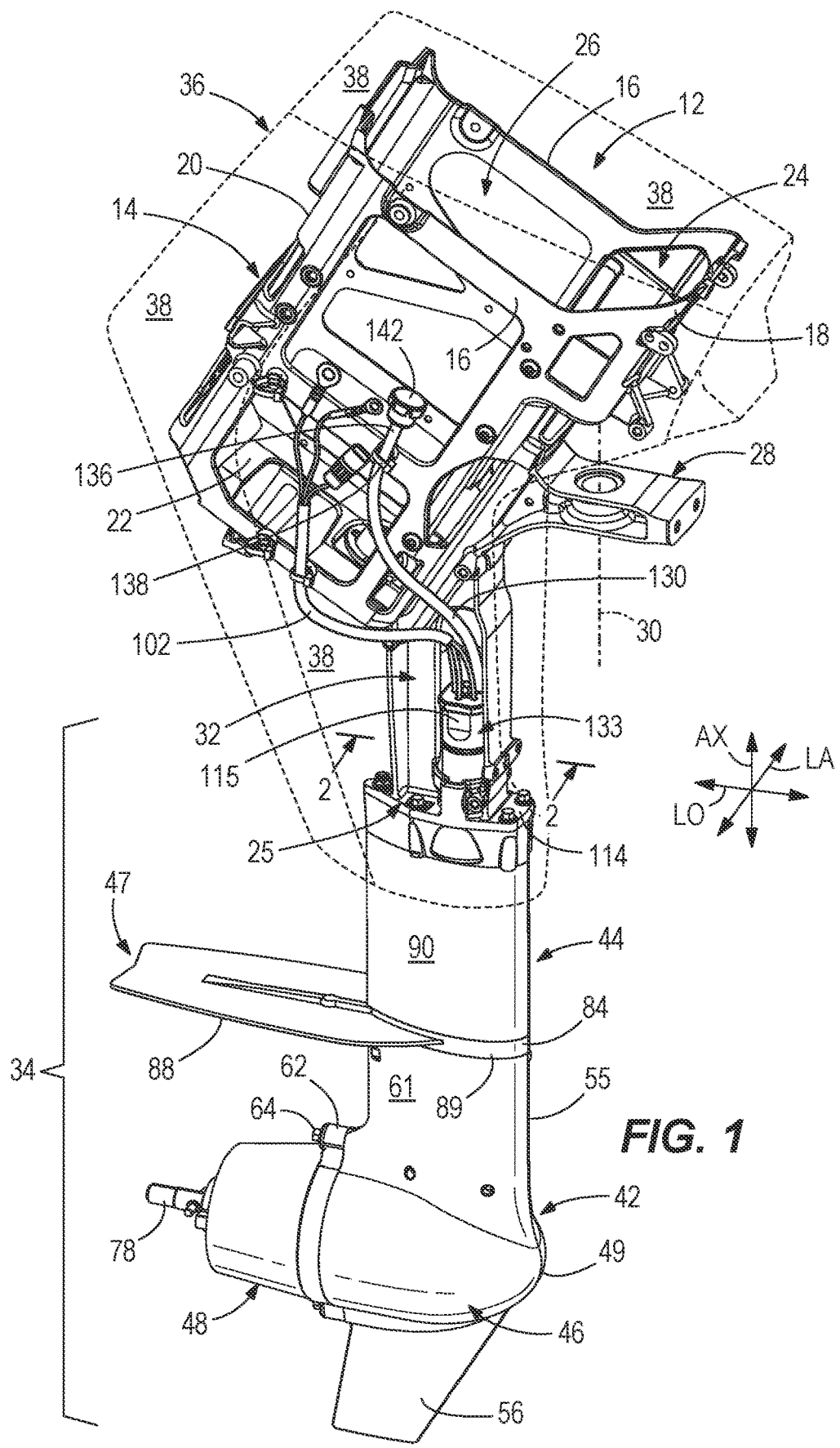
FIG. 1 is a perspective view of portions of a marine drive, including a supporting frame, an extension leg, and a motor housing having a motor cavity.

FIG. 1 depicts a marine drive 10 for propelling a marine vessel in water. In the illustrated embodiment, the marine drive 10 extends from top to bottom in an axial direction AX, from front to back in a longitudinal direction LO which is perpendicular to the axial direction AX, and from side to opposite side in a lateral direction LA which is perpendicular to the axial direction AX and perpendicular to the longitudinal direction LO. FIG. 1 only depicts certain portions of the marine drive 10. Although not shown, the marine drive 10 is attachable to the marine vessel via for example a conventional transom bracket and/or the like. Other suitable arrangements are provided in the above-incorporated patents, and others are widely commercially available for purchase from Brunswick Corporation and its companies Attwood and Mercury Marine, among others.

The marine drive 10 is an outboard motor having a supporting frame 12 for rigidly supporting the various components of the marine drive 10 relative to the marine vessel. The supporting frame 12 has a generally rectangular, box-shaped body 14 with port and starboard sides 16, a front side 18, a rear side 20, a bottom 22, and an open upper end 24 providing access to a frame interior for containing a (not shown) rechargeable battery providing battery power to the marine drive 10. The supporting frame 12 also has a steering arm 28 extending forwardly from the front side 18 of the body 14. The steering arm 28 is configured for connection to a (not shown) tiller arm for manually steering the marine drive 10 relative to the marine vessel about a steering axis 30, which is defined by the above-noted transom bracket. See for example the presently-incorporated U.S. patent application Ser. No. 17/509,739. The supporting frame 12 also has a support leg 32 extending downwardly from the bottom 22 of the body 14 and having a lower end 25 which is fixedly coupled to the lower unit 34 of the marine drive 10, as will be further described herein below. A cowling, shown schematically at 36, is fixed to and surrounds most or all of the body 14 of the supporting frame 12, as further disclosed in the above-incorporated U.S. patent application Ser. No. 17/585,214. The cowling 36 defines a cowling interior 38 in which the body 14 of the supporting frame 12 and various components of the marine drive 10 are disposed. It should be understood that the various components described above are exemplary and could vary from what is shown. For example, the present invention is not limited for use with the particular type of supporting frame shown in the figures. The supporting frame can be any type of supporting frame known in the art for framing and supporting portions of the marine drive, including being configured to support various components of the marine drive, and/or to couple the marine drive to the marine vessel. Embodiments of various other suitable supporting frames for marine drives are provided in the above-incorporated patents.

Figure 2:
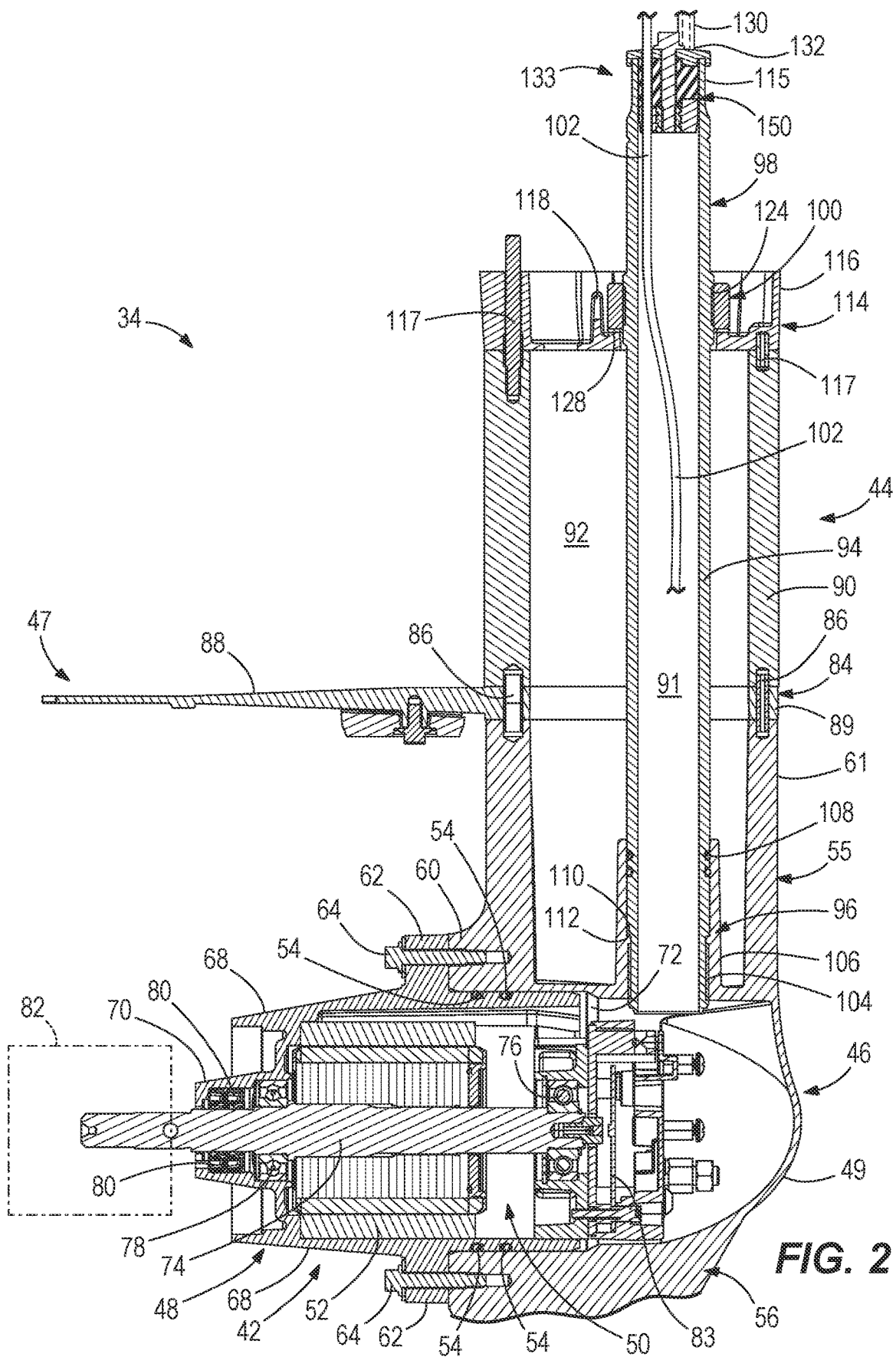
FIG. 2 is a view of section 2-2, taken in FIG. 1.

Referring now to FIG. 2, the marine drive 10 has a lower unit 34, which is a subject of the present disclosure. The lower unit 34 generally includes a motor housing 42, an extension leg 44, and an anti-ventilation plate 47 disposed between the motor housing 42 and the extension leg 44. The motor housing 42 has a front housing portion 46 and a rear housing portion 48, which are mated together and define a motor cavity 50 for containing an electric motor 52 and related componentry, which otherwise defines a generally open space that is devoid of fluid. The front housing portion 46 has a nosecone 49 with a smooth outer surface which transitions to an upwardly-extending stem 55 and a downwardly-extending skeg 56. The stem 55 has a perimeter sidewall 61 which preferably is monolithic so as to avoid visible fasteners or unsightly seams. In other embodiments it can be made of multiple pieces. The nosecone 49 is generally located axially between the stem 55 and the skeg 56, and protrudes forwardly therefrom. The front housing portion 46 also has a rear-facing annular body portion 60 which receives the rear housing portion 48 in the nested configuration shown. Static O-ring seals 54 are located radially between the front housing portion 46 and rear housing portion 48 and are configured to seal these components together preferably so as to entirely prevent water intrusion into the motor cavity 50.

The rear housing portion 48 has a radially outer annular flange 62. Fasteners 64 extend through smooth bores in the radially outer annular flange 62 and into threaded engagement with corresponding threaded bores in the face of the rear-facing annular body portion 60 of the front housing portion 46, so as to firmly fasten the rear housing portion 48 to the front housing portion 46 in the nested arrangement shown. The rear housing portion 48 is generally cylindrical, having a perimeter sidewall 68 which smoothly tapers radially inwardly towards its rear end.

The electric motor 52 is generally cylindrical and is contained within the rear housing portion 48, in particular being mounted between a rear end cap 70 and a front end wall 72 of the rear housing portion 48. The electric motor 52 causes rotation of a propulsor shaft 74 which longitudinally extends from the rear of the rear housing portion 48 via the rear end cap 70. The electric motor 52 is a conventional item, for example an axial flux motor, a radial flux motor, or a transverse flux motor, such as those produced by Electric Torque Machines of Flagstaff, Arizona (a Graco Company). Front and rear bearings 76, 78 support and facilitate rotation of the propulsor shaft 74 relative to the electric motor 52. Annular dynamic seals 80 surround the propulsor shaft 74 and dynamically seal the rear housing portion 48 via the rear end cap 70 to the rotating propulsor shaft 74 and preferably prevents ingress of water to the motor cavity 50. A conventional propulsor, shown schematically at box 82 in FIG. 2, is mounted on the outer end of the propulsor shaft 74 such that rotation of the propulsor shaft 74 by the electric motor 52 causes rotation of the propulsor 82, which in turn generates a thrust force for propelling the marine vessel in water. The type and configuration of the propulsor 82 can vary, and for example can include one or more propellers, impellers, and/or the like. A printed circuit board 83 is mounted on the front end wall 72 and provides a controller for controlling operation of the electric motor 52.

The anti-ventilation plate 47 has a head 84 at its forward end which is sandwiched between the lower end of the extension leg 44 and the stem 55 of the front housing portion 46. The head 84 has a perimeter sidewall 89 with a rounded forward end and a tapered rear end. The perimeter sidewall 89 is preferably monolithic so as to avoid external fasteners or other unsightly seams. In other examples it can be made of multiple pieces. The radially outer profile of the head 84 generally matches the radially outer profile of the lower end of the extension leg 44 and also generally matches the radially outer profile of the upper end of the stem 55, in particular such that these components together provide a smooth outer surface which is streamlined and encounters minimal hydrodynamic drag as the marine vessel travels through the water. Pins 86 register and maintain the head 84 of the anti-ventilation plate 47 in alignment with the stem 55 and the lower end of the extension leg 44. The pins 86 extend through bores formed through the head 84 of the anti-ventilation plate 47 and into corresponding bores formed in the lower end of the extension leg 44 and in the upper end of the stem 55. The anti-ventilation plate 47 has a generally flat tail 88 which extends rearwardly from both sides of the head 84.

With continued reference to FIG. 2, the extension leg 44 is a sleeve having the perimeter sidewall 90 which defines a hollow interior 92. The sleeve is preferably monolithic to as to avoid externally visible fasteners or unsightly seam lines. In other embodiments it can be formed from multiple pieces. A rigid conduit portion or tube 94 is located in the hollow interior 92. The rigid conduit portion 94 is generally impervious to fluids and has an hollow interior 91, a lower end 96 which is fixedly coupled to the motor housing 42 and an upper end 98 which is coupled to the supporting frame 12 via a compression nut 100, the function of which will be further described herein below. In the non-limiting illustrated embodiment, the rigid conduit portion 94 is a monolithic aluminum tube. The hollow interior 91 provides a passageway for among other things, a wiring harness comprising electrical wires 102 extending from an upper portion of the marine drive 10 to the motor cavity 50, and for connection to the electric motor 52, i.e., for providing electricity to the electric motor 52 and/or for controlling the electric motor 52. The lower end 96 of the rigid conduit portion 94 is fixedly or rigidly coupled to the motor housing 42 by a threaded connection 104 comprising outer threads on the outer diameter of the rigid conduit portion 94 and inner threads on the inner diameter of a cylindrical stack 106 extending upwardly from a bottom wall 107 of the stem 55. Static O-ring seals 108 provide a seal between the outer diameter of the rigid conduit portion 94 and the inner diameter of the cylindrical stack 106 and prevents ingress of water into the motor cavity 50. Thus the motor cavity 50 is effectively sealed from intrusion of water via the seal interfaces provided by seals 54, 80 and 108 and via a seal device 150, which will be further described herein below. The seals 54, 80, 108 and 150 are exposed to the open interior of the motor cavity 50 and thus are subject to the environmental conditions therein, including changes in pressure, etc., as described herein above. A radially outer shoulder 110 on the lower end 96 of the rigid conduit portion 94 bottoms out on a radially inner shoulder 112 in the cylindrical stack 106 when the threaded connection 104 is fully engaged. The outer diameter of the rigid conduit portion 94 at the upper end 98 has flat surfaces 115 (see FIG. 1) for engagement by a manual tool during installation, in particular for rotating the upper end 98 of the rigid conduit portion 94 relative to the motor housing 42 so as to complete the threaded connection 104.

An adapter plate 114 is fastened to and between the upper end of the extension leg 44 and the lower end 25 of the supporting frame 12. The adapter plate 114 has a sidewall 116 with a radially outer profile which generally matches the radially outer profile of the upper end of the extension leg 44, in particular such that these components together provide a smooth outer surface which is streamlined and provides minimal hydrodynamic drag as the marine vessel travels through the water. Pins 117 register and maintain the adapter plate 114 in alignment with extension leg 44. The pins 117 extend into bores formed in the perimeter sidewall of the adapter plate 114 and into corresponding bores formed in the perimeter sidewall of the upper end of the extension leg 44. The adapter plate 114 has an interior abutment surface 118 which laterally and longitudinally extends between the rigid conduit portion 94 and the inner diameter of the sidewall 116 of the adapter plate 114. The interior abutment surface 118 extends entirely around the rigid conduit portion 94. As best seen in FIG. 1, the upper end 98 of the rigid conduit portion 94 axially extends out of the hollow interior 92 of the extension leg 44, through a hole in the interior abutment surface 118, and protrudes into an interior passage 103 of the supporting frame 12.

The compression nut 122 is engaged with the upper end 98 of the rigid conduit portion 94 via a threaded connection 124, and particularly so as to clamp the extension leg 44 in place between the supporting frame 12 and the motor housing 42, thereby providing increased overall load carrying capability compared to the prior art and advantageously avoiding the use of fasteners which are visible from the exterior of the lower unit 34. The inner diameter of the compression nut 122 has threads for engaging corresponding threads on the upper end 98 of the rigid conduit portion 94. Flats are disposed around the outer perimeter of the compression nut 122 for engagement by a manual tool for rotating the compression nut 122 about the rigid conduit portion 94.

To assemble the lower unit, a washer 128 and the compression nut 122 are slid onto the upper end 98 of the rigid conduit portion 94 until the threads abut. The compression nut 122 is then rotated by a wrench in a direction which causes the compression nut 122 to travel downwardly along the rigid conduit portion 94, via engagement between the threads. Continued rotation of the compression nut 122 moves it into compressing engagement with the top of the interior abutment surface 118. Compression of the compression nut 122 applies a corresponding clamping force on the adapter plate 114, which pulls the rigid conduit portion 94 and motor housing 42 axially upwardly. This firmly compresses and clamps the head 84 of the anti-ventilation plate 47 and the extension leg 44 between the motor housing 42 and bottom of the adapter plate 114 without the need for external fasteners and in an improved load-bearing arrangement. Advantageously the entire arrangement can be easily assembled in an efficient manner and with minimal externally visible fasteners.

As shown in FIGS. 1 and 2, a flexible conduit portion 130 is connected to the rigid conduit portion 94 at a junction 133. The flexible conduit portion 130 has a lower end 132 coupled to the upper end 98 of the rigid conduit portion 94 at junction 133 and an upper end 136 disposed in the cowling interior 38, and fastened to the starboard side 16 of the supporting frame 12 by a zip tie 138. Note that the location of the end 136 of the flexible conduit portion 130 and the manner in which it is fastened to the supporting frame 12 or other structure can vary from what is shown and described. Together, the rigid conduit portion 94 and the flexible conduit portion 130 advantageously provide an elongated vent conduit having an end 96 connected to the motor cavity 50 and an end 136 which vents the motor cavity 50 to atmosphere in the cowling interior 38. The vent conduit extends from the motor housing 42 into and through the extension leg 44 and into the cowling interior 38. In the illustrated embodiment, the rigid conduit portion 94 is an elongated monolithic member and the flexible conduit portion 130 is an elongated monolithic member. Referring to FIG. 1, a hydrophobic plug 142 is located on the end 136 of the vent conduit. The hydrophobic plug 142 is configured to permit venting of air and moisture from the motor cavity 50 but to prevent ingress of moisture to the motor cavity 50. The type and configuration of hydrophobic plug 142 can vary from what is shown. In the illustrated embodiment, the hydrophobic plug 142 is a cap with a hydrophobic and oleophobic membrane and a sorbent filter, and is available for purchase from W.L. Gore & Associates, product name AVS41, VE2048. In other embodiments, the plug 142 can include a one-way valve which vents the motor cavity 50 to atmosphere in one direction, but not in both directions. This embodiment will prevent a vacuum in the system, as further described herein below, but not prevent buildup of pressure within the system.

Figure 4:
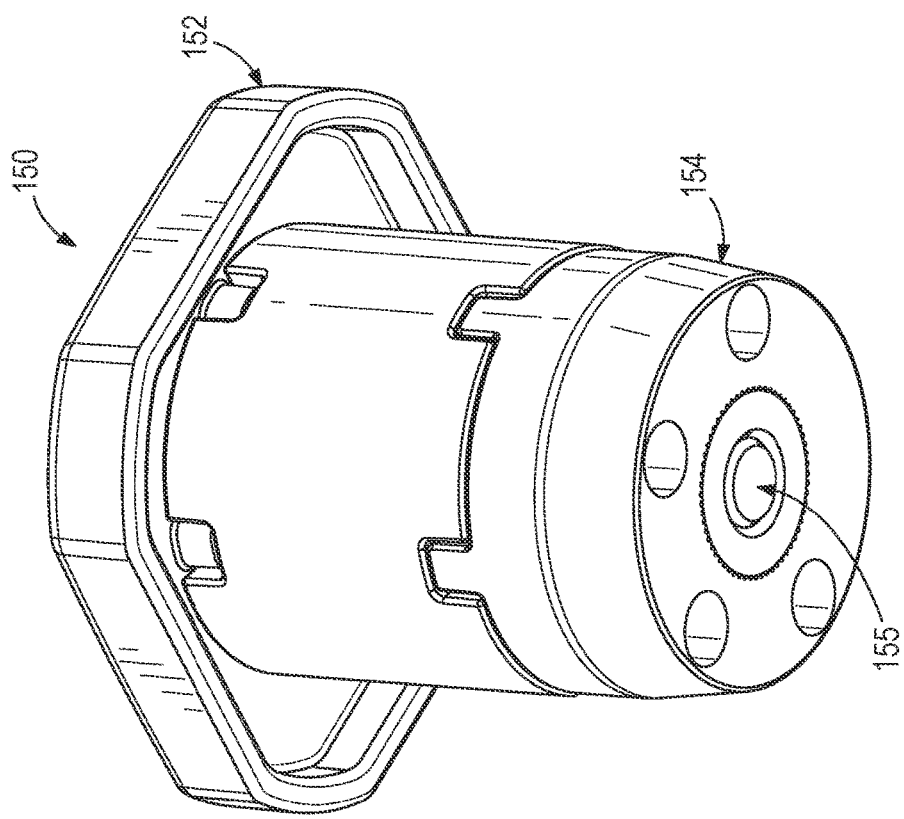
FIG. 4 is a perspective view of the seal device.
Figure 3:
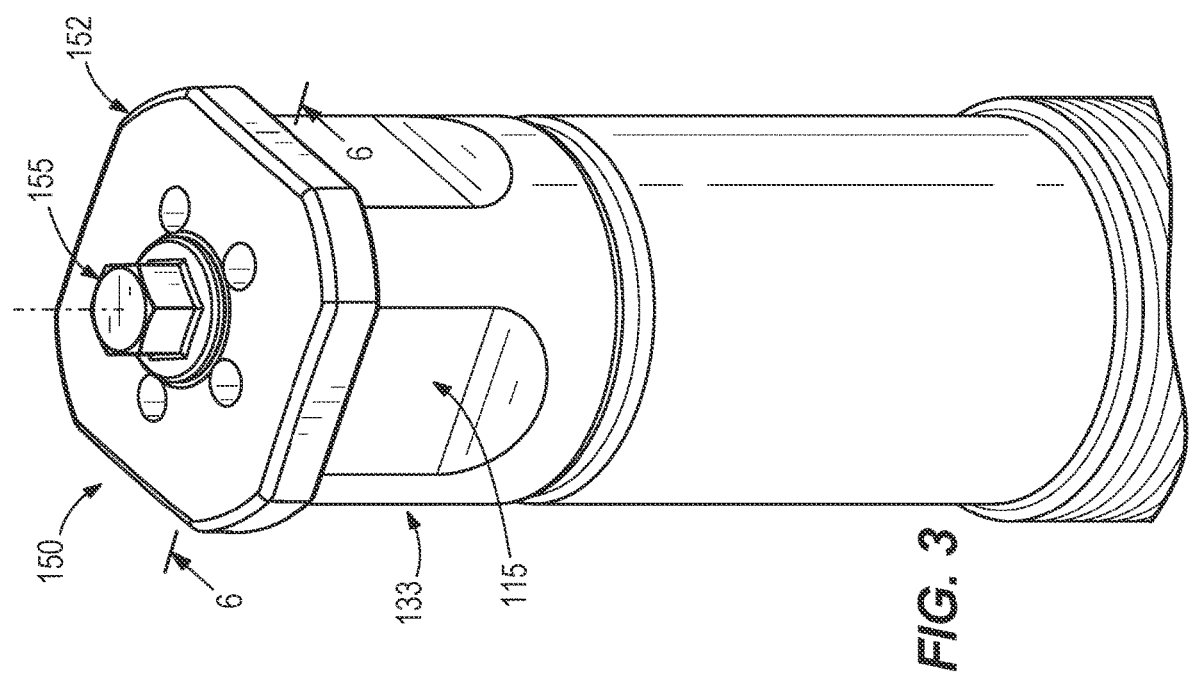
FIG. 3 is a view of a seal device on first portion of a vent conduit which vents the motor cavity to atmosphere.
Figure 5:
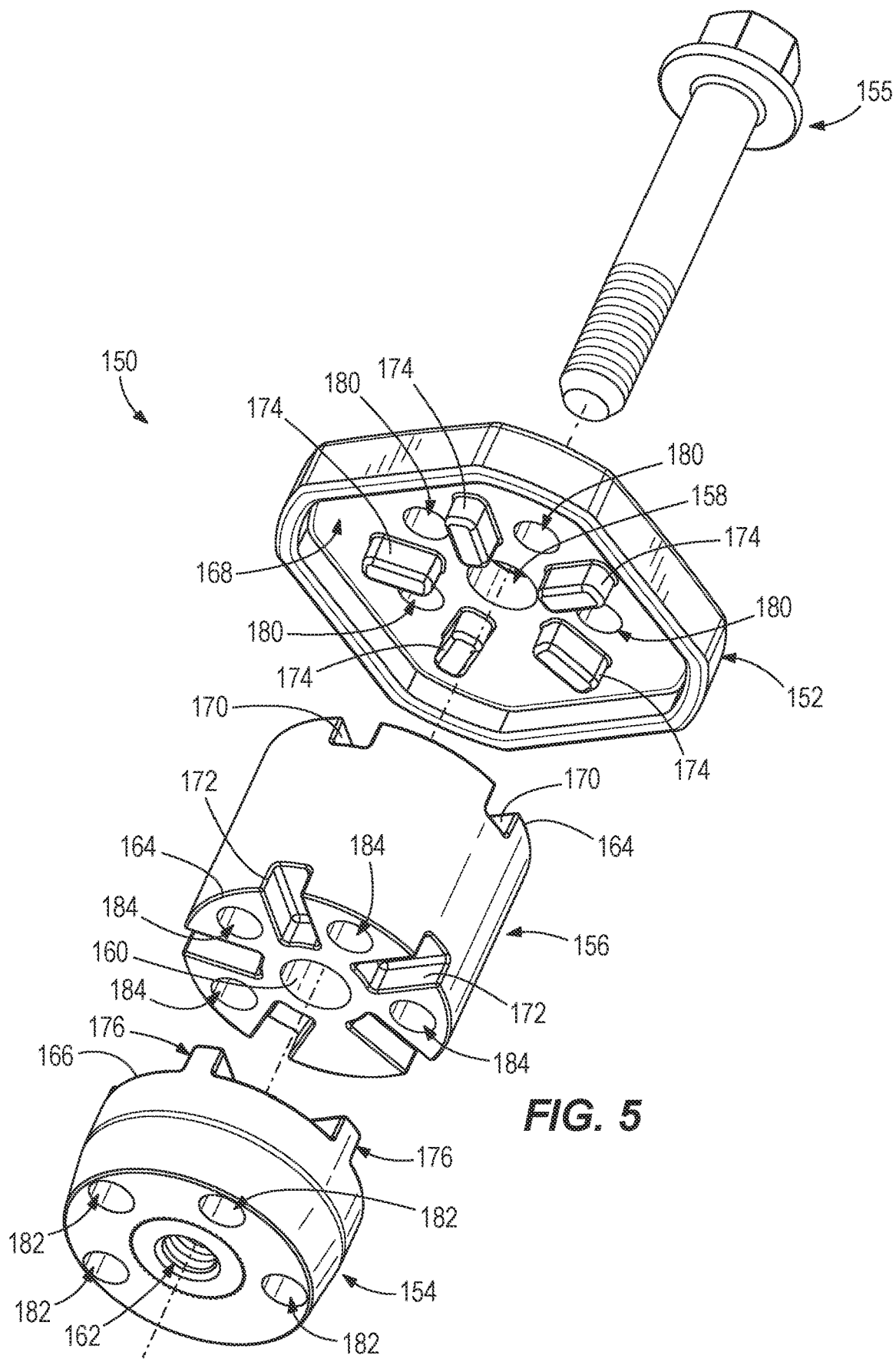
FIG. 5 is an exploded view of the seal device.

As shown in FIG. 2, a novel seal device 150 seals the rigid conduit portion 94 to the flexible conduit portion 130 at the junction 133. The type and configuration of the seal device 150 can vary from what is shown and described. In the illustrated embodiment, the seal device 150 extends into the upper end 98 of the rigid conduit portion 94. As shown in FIGS. 3-5, the seal device 150 includes a rigid top cap 152, a rigid annular base member 154 and a cylindrical seal member 156 which is sandwiched between the top cap 152 and base member 154. The seal member 156 is made of a flexible material such as rubber and is resilient so that it is able to deform under pressure but tends to retain the shape shown in FIG. 5. A fastener 155 extends through a hole 158 in the top cap 152, through a center bore 160 in the seal member 156, and into threaded engagement with a threaded counterbore 162 in the base member 154. As such, tightening the fastener 155 via the threaded engagement with the counterbore 162 clamps the top cap 152 and base member 154 together, which compresses the seal member 156. Compression of the seal member 156 causes it to radially outwardly expand, as further described herein below with reference to FIGS. 6-8, so as to abut and form a water-tight seal with the inner diameter of the rigid conduit portion 94. The flexible conduit portion 94 is made of a flexible material such as rubber which is generally impervious to fluids. The seal member 156 has opposing end faces 164 which face inner end faces 166, 168 on the top cap 152 and base member 154, respectively. The end faces 164 have radially-extending slots 170, 172 which receive corresponding radially extending ridges 174, 176 on the top cap 152 and base member 154, respectively so as to securely align the seal member 156 with the top cap 152 and base member 154 and such that the center bore 160 is aligned with the hole 158 in the top cap 152 and the counterbore 162 in the base member 154. Engagement of the slots 170, 172 and ridges 174, 176 also aligns through-bores 180, 182, 184 formed through the top cap 152, base member 154 and seal member 156, respectively. The through-bores 180, 182, 184 define passageways for electrical wires 102 connecting the noted battery in the cowling interior 38 to the printed circuit board 83 and electric motor 52, and also define a passageway into which the lower end 132 of the flexible conduit portion 130 extends in such a way that it is open to hollow interior of the rigid conduit portion 94.

As further explained herein below with reference to FIGS. 6-8, tightening the fastener 155 via the threaded engagement with the counterbore 162 clamps the top cap 152 and base member 154 together, which compresses the seal member 156 and causes the through-bores 184 to expand radially inwardly so that the inner diameter surfaces of the through-bores 184 form a water-tight seal with the outer diameters of the electrical wires 102 and flexible conduit portion 130. Thus it will be understood that the seal device 150 effectively seals the rigid conduit portion 94 to the flexible conduit portion 130 at the junction 133. The seal device 150 is located radially between the upper end 98 of the rigid conduit portion 94. The seal device 150 provides a radial seal on the outer diameter of the flexible conduit portion 130. Axial compression of the seal member 156 causes the it to radially expand and create a radial seal on the inner diameter of the upper end 98 of the rigid conduit portion 94 and also a radial seal on the outer diameter of the lower end 132 of the flexible conduit portion 130.

Figure 6:
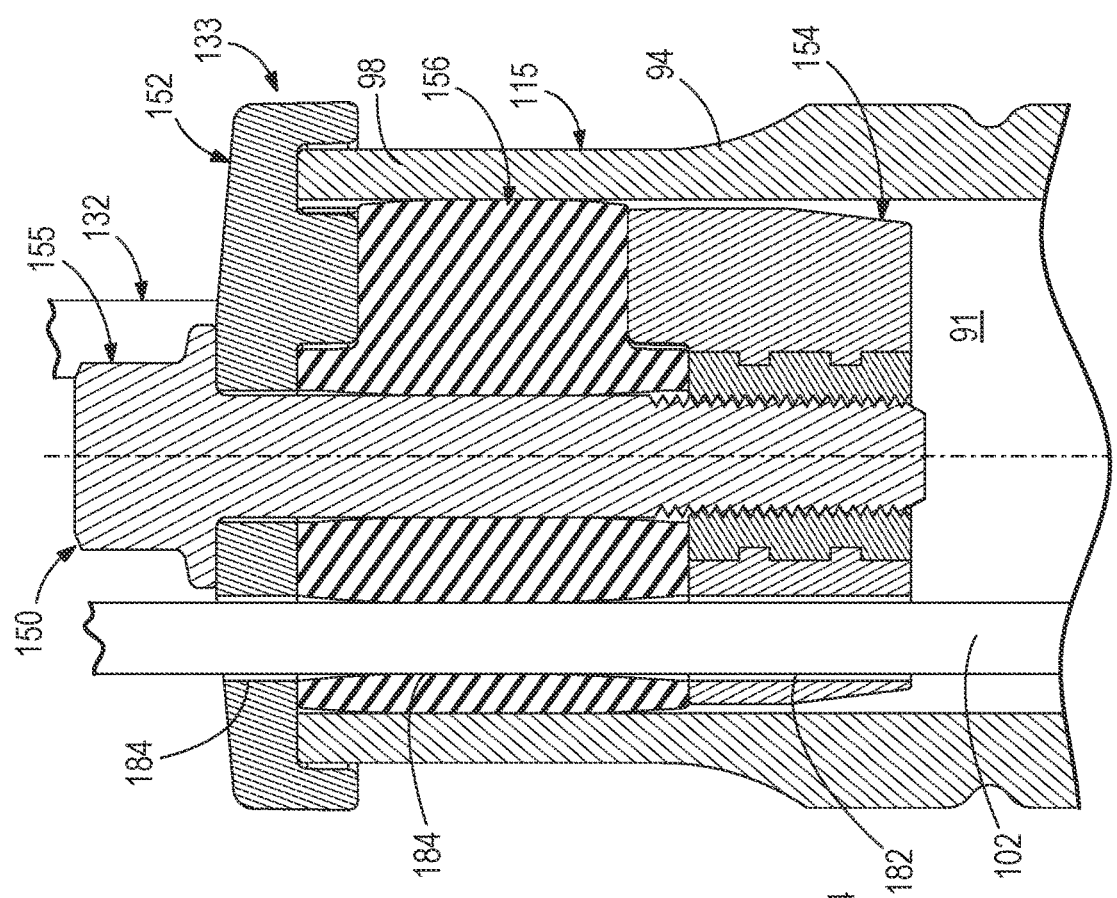
FIG. 6 is a view of section 6-6, taken in FIG. 3, showing the seal device during installation on the vent conduit.
Figure 7:
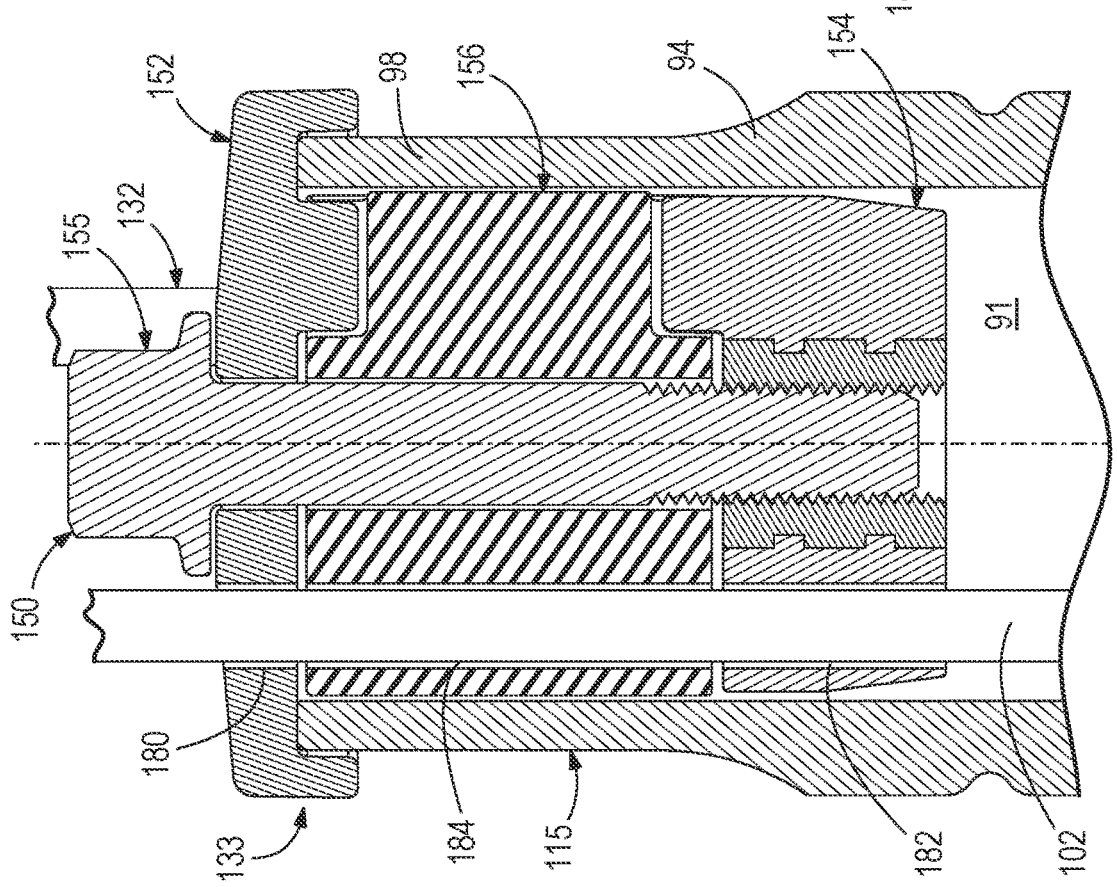
FIG. 7 is a view like FIG. 6, showing the seal device installed on the vent conduit and sealed to an electrical wire.
Figure 8:
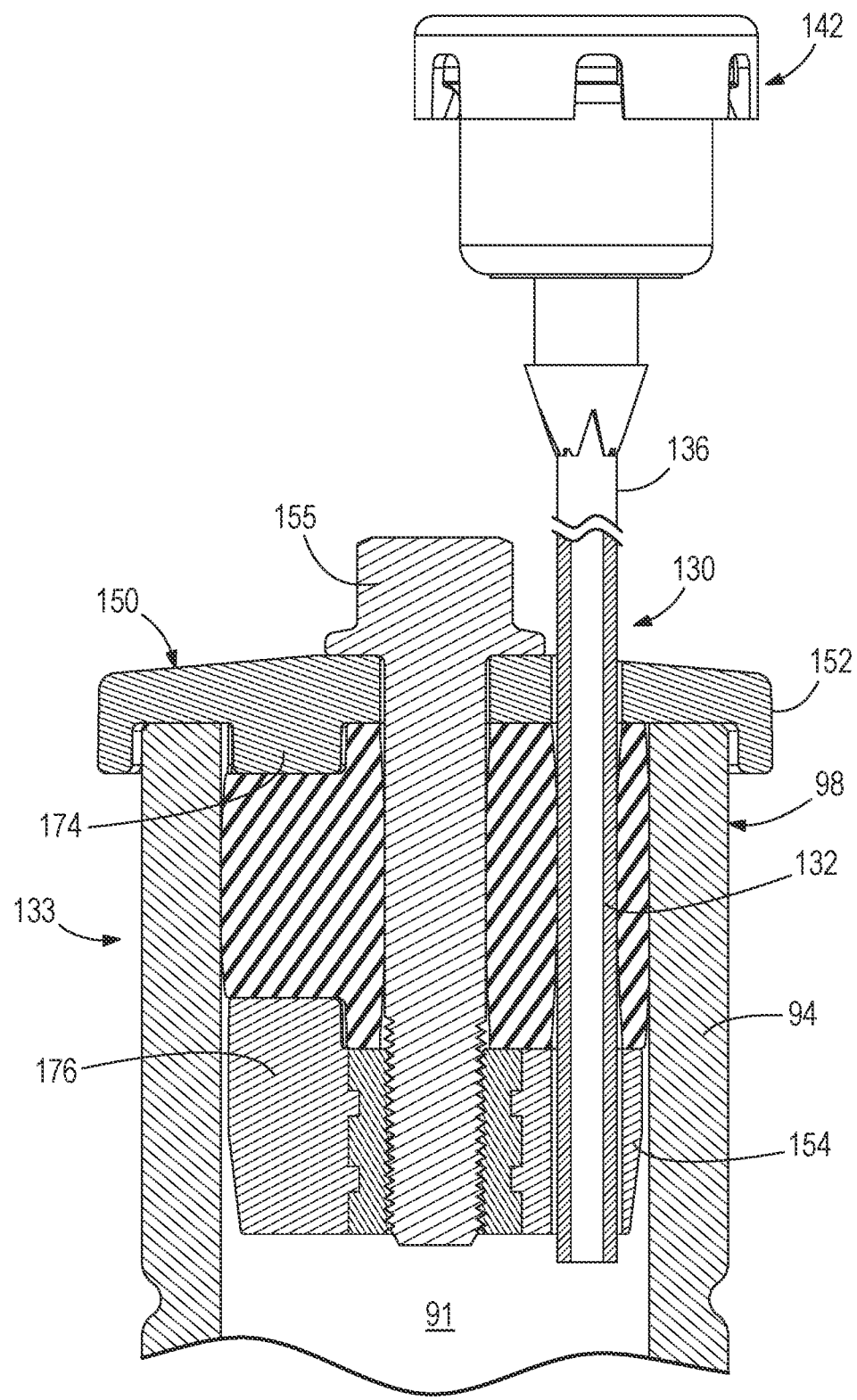
FIG. 8 is a view of section 8-8, taken in FIG. 3.

Referring to FIGS. 6-8, the seal device 150 is installed by inserting the electrical wires 102 through the respective through-bores 180, 182, 184 and by inserting the lower end 132 of the flexible conduit portion 130 into the respective through-bore 180, 182, 184, as described above. Next, the base member 154 and seal member 156 are inserted into the upper end 98 of the rigid conduit portion 94 until the bottom of the top cap 152 engages the top of the upper end 98, as shown. Finally, the fastener 155 is tightened, which as described above compresses the seal member 156 so as to form radial seals with the rigid conduit portion 94, electrical wires 102 and flexible conduit portion 130.

It will thus be understood that the embodiments described herein above are advantageously configured to limit or prevent water intrusion into the motor cavity, maintaining the sealed conditions established at assembly. With the vent conduit, including the rigid conduit portion 94 which is open to the motor cavity 50 and the flexible conduit portion 130 which is sealed to the rigid conduit portion 94 and also open to atmosphere within the cowl interior 38, the presently disclosed embodiments also advantageously prevent a vacuum from forming within the motor cavity, and in some embodiments prevent buildup of pressure within the motor cavity, thus further limiting degradation or breakage of the seals of the motor housing. The embodiments described herein above advantageously provide a sealed motor cavity with a dedicated vent conduit extending up above the normal water line, into the cowling interior. In certain embodiments, the vent conduit further has a breathable, hydrophobic type membrane which is configured to prevent water/moisture intrusion, but yet still allow air to pass in and out of the otherwise sealed motor cavity. Embodiments described herein also advantageously allow leak testing during manufacturing. For example, a simple pressure test can be performed during manufacturing of the unit with hose barb fittings connected to the flexible conduit portion, as a quality control check. This could also be easily used in the field in the same manner. Generally, the present invention thus provides a reduction of water intrusion to the motor cavity and provides a simple means to verify assembly processes/failure modes.

In the present description, certain terms have been used for brevity, clarity, and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A marine drive for propelling a marine vessel in a body of water, the marine drive comprising:
   a motor housing,
   a motor in the motor housing, the motor being configured to cause a propulsor of the marine drive to create a thrust force in the body of water,
   a vent conduit that vents the motor housing to atmosphere, and
   a hydrophobic plug configured to permit venting of air and moisture from the motor housing via the vent conduit and configured to prevent ingress of moisture to the motor housing via the vent conduit.

2. The marine drive according to claim 1, further comprising a supporting frame configured to support the marine drive relative to the marine vessel, and an extension leg that extends from the supporting frame to the motor housing, wherein the vent conduit extends from the motor housing into the extension leg.

3. The marine drive according to claim 2, further comprising a cowling on the supporting frame, wherein the vent conduit extends through the extension leg and into an interior of the cowling.

4. The marine drive according to claim 3, wherein the vent conduit has a first conduit portion disposed in the extension leg and a second conduit portion disposed in the interior of the cowling.

5. The marine drive according to claim 4, further comprising a seal device that seals the first conduit portion to the second conduit portion.

6. The marine drive according to claim 5, wherein the seal device provides a radial seal on an inner diameter of a first one of the first and second conduit portions and a radial seal on an outer diameter a second one of the first and second conduit portions.

7. The marine drive according to claim 6, wherein the first conduit portion has an upper end and the second conduit portion has a lower end, and wherein the seal device is located radially between the upper end of the first conduit portion and the lower end of the second conduit portion.

8. A marine drive for propelling a marine vessel in a body of water, the marine drive comprising:
   a motor housing,
   a motor in the motor housing, the motor being configured to cause a propulsor of the marine drive to create a thrust force in the body of water,
   a vent conduit that vents the motor housing to atmosphere, wherein the vent conduit has a first conduit portion and a second conduit portion, and
   a seal device that seals the first conduit portion and the second conduit portion relative to each other, wherein the seal device has a rigid top cap, a rigid base member, a seal member sandwiched between the rigid top cap and rigid base member, and a fastener that fastens the rigid top cap to the rigid base member so as to axially compress resilient seal member.

9. The marine drive according to claim 8, wherein axial compression of the resilient seal member causes the resilient seal member to radially expand and create a radial seal with the vent conduit.

10. The marine drive according to claim 8, further comprising at least one electrical wire associated with the motor, and wherein the seal device provides a radial seal on the at least one electrical wire.

11. The marine drive according to claim 8, wherein the first conduit portion is an elongated rigid monolithic member and wherein the second conduit portion is an elongated monolithic flexible member.

12. The marine drive according to claim 11, wherein the second conduit portion is coupled to a supporting frame of the marine drive.

13. The marine drive according to claim 2, wherein the motor housing has a first housing portion and a second housing portion, and further comprising at least one static seal between the first housing portion and second housing portion.

14. The marine drive according to claim 13, further comprising at least one dynamic seal between a propulsor shaft of the propulsor and the second housing portion.

15. The marine drive according to claim 14 wherein the at least one static seal and the at least one dynamic seal prevent ingress of water to the motor housing.

16. The marine drive according to claim 14, further comprising at least one static seal located between the first housing portion and the vent conduit and configured to prevent ingress of water into the motor housing.

17. A marine drive for propelling a marine vessel in a body of water, the marine drive comprising:
   a supporting frame for supporting the marine drive relative to the marine vessel;
   a motor housing defining a motor cavity;
   an extension leg that couples the motor housing to the supporting frame;
   a motor disposed in the motor cavity;
   a propulsor shaft extending from the motor housing, wherein the motor is configured to cause rotation of the propulsor shaft;
   a propulsor that is rotated by the propulsor shaft to create a thrust force in the body of water;
   a vent conduit having a first end connected to the motor cavity and a second end that vents the motor cavity to atmosphere, wherein the vent conduit extends from the motor housing into the extension leg; and
   a hydrophobic plug on the second end of the vent conduit, the hydrophobic plug permitting venting of air and moisture from the motor cavity and preventing ingress of moisture to the motor cavity.

18. A marine drive for propelling a marine vessel in a body of water, the marine drive comprising:
   a motor housing,
   a motor in the motor housing, the motor being configured to cause a propulsor of the marine drive to create a thrust force in the body of water,
   a vent conduit that vents the motor housing to atmosphere,
   a supporting frame for supporting the marine drive relative to the marine vessel, and
   an extension leg that extends from the supporting frame to the motor housing, wherein the vent conduit extends from the motor housing into the extension leg.

19. The marine drive according to claim 18, further comprising a cowling on the supporting frame, wherein the vent conduit extends through the extension leg and into an interior of the cowling.

20. The marine drive according to claim 19, further comprising a hydrophobic plug configured to permit venting of air and moisture from the motor housing via the vent conduit and further configured to prevent ingress of moisture to the motor housing via the vent conduit.

* * * * *